United States Patent [19]

Kubo et al.

[11] 4,394,827
[45] Jul. 26, 1983

[54] TRANSMISSION CONTROL SYSTEM WITH MODIFIED FRICTION ENGAGING MECHANISM ACTUATING PRESSURE

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Toyota, Japan

[21] Appl. No.: 210,214

[22] Filed: Nov. 25, 1980

[30] Foreign Application Priority Data

Mar. 27, 1980 [JP] Japan .................................. 55-39537

[51] Int. Cl.³ .............................................. B60K 41/10
[52] U.S. Cl. ....................................... 74/868; 74/865; 74/867
[58] Field of Search ................. 74/861, 863, 865, 867, 74/868, 869

[56] References Cited

U.S. PATENT DOCUMENTS

| 3,908,485 | 9/1975 | Moyauchi | 74/863 |
| 4,056,991 | 11/1977 | Sakai | 74/863 |
| 4,125,038 | 11/1978 | Hiramatsu | 74/865 |
| 4,308,765 | 1/1982 | Iwanaga | 74/865 |
| 4,324,156 | 4/1982 | Iwanaga | 74/867 |

FOREIGN PATENT DOCUMENTS

| 2450584 | 5/1975 | Fed. Rep. of Germany | 74/861 |
| 52-14174 | 2/1977 | Japan | 74/867 |

Primary Examiner—Kenneth Dorner
Assistant Examiner—D. Wright
Attorney, Agent, or Firm—Stevens, Davis, Miller & Mosher

[57] ABSTRACT

A fluid pressure control system for controlling an automatic transmission which includes a gear transmission mechanism and several fluid pressure actuated friction engaging mechanisms, selective engagement of which provides various speed stages from the gear transmission mechanism. A line pressure valve produces a line pressure which increases from a base pressure by an amount proportional to engine load. A throttle pressure valve produces a throttle pressure which is proportional to engine load. A shift valve selectively switches supply of an actuating pressure to one of the friction engaging mechanisms via a passage, according to the operational condition of the vehicle. The actuating pressure is supplied by a fluid pressure control system which receives supply of line pressure and which outputs a pressure which, when engine load is medium, is approximately equal to line pressure, but which, when engine load is small or is large, is substantially lower than line pressure. Thereby, the performance of the actuating pressure for cushioning over abrupt engagement of the friction engaging mechanism is more suitably tailored to the torque characteristics of the engine of the vehicle, and gear shift shock is accordingly reduced.

2 Claims, 3 Drawing Figures

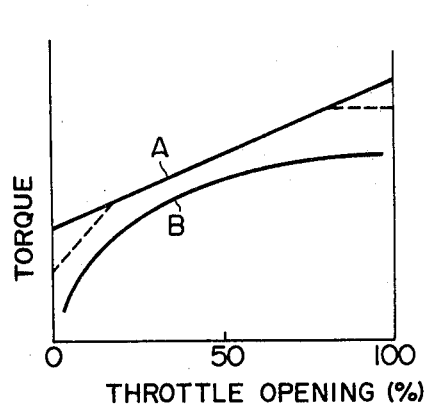
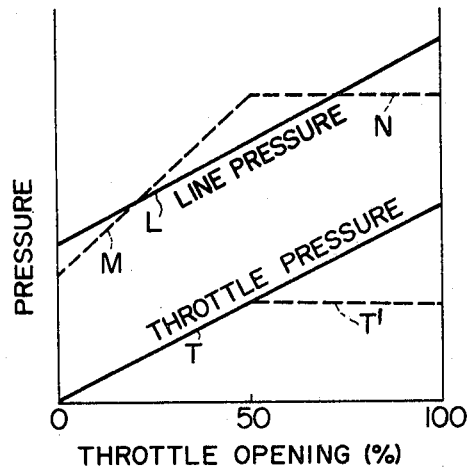
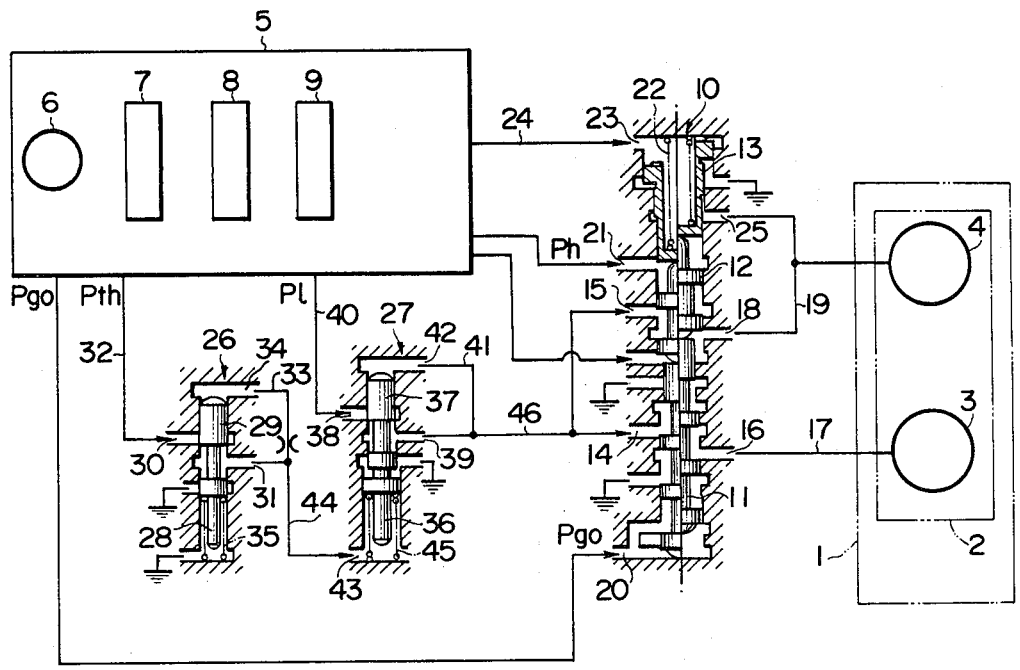

TRANSMISSION CONTROL SYSTEM WITH MODIFIED FRICTION ENGAGING MECHANISM ACTUATING PRESSURE

BACKGROUND OF THE INVENTION

The present invention relates to a fluid pressure control system for controlling an automatic transmission which is used in an automotive vehicle, and, more particularly, relates to an improvement in such a fluid pressure control system for more suitably conforming the characteristics of the shifting performance of the transmission to the torque output characteristics of the engine of the vehicle.

Automatic transmissions for automotive vehicles are well known. They typically include a transmission gear shift mechanism and several friction engaging units such as clutches and brakes. By the selective engagement and disengagement of the friction engaging mechanisms, which are typically actuated by fluid pressure, various speed stages are made available from the gear transmission mechanism.

Various fluid pressure control systems are known for providing actuating fluid pressures for the friction engaging mechanisms. Typically, such a fluid pressure control system includes a throttle fluid pressure control valve, which produces a throttle fluid pressure which varies linearly according to a quantity representing the load on the engine of the vehicle, which is usually, in the case of an engine fitted with a carburetor, the opening amount of the throttle valve of the carburetor; a governor fluid pressure control valve which produces a governor fluid pressure which varies linearly according to the road speed of the vehicle; and at least one shift valve, which shifts according to a balance between the throttle pressure and the governor pressure, and thereby selectively supplies fluid pressure to, and exhausts fluid pressure from, at least one of the aforesaid plurality of friction engaging mechanisms.

Such a friction engaging mechanism generally comprises two groups of friction plate elements, these two groups being mutually interleaved, and being respectively connected to elements of the gear transmission mechanism and/or the housing thereof which are mutually rotatable. Further, a fluid pressure activated servo device is typically provided, supply of operating fluid pressure to which squeezes together the two groups of friction plate elements so that they engage together and transmit torque between the aforesaid mutually rotatable parts of the transmission. In more detail, when the servo device is not compressing together the two groups of friction plate elements, they are able substantially freely to rotate with respect to one another; and, as operating fluid pressure supplied to the servo device progressively increases, the groups of friction plate elements are progressively more and more strongly squeezed together, and accordingly their maximum torque transmitting ability progressively increases, in approximately direct proportion to the magnitude of the operating fluid pressure provided to the servo device. Finally, when the operating fluid pressure provided to the servo device reaches a sufficiently high level, the two groups of friction plate elements are locked together, and are securely engaged together, so that they cannot rotate with respect to one another.

A major problem with regard to prior art fluid pressure control systems has been the ensuring of smooth engagement of such a friction engaging mechanism, in order for the transmission to change speeds without producing any transmission shift shock, over a wide range of operating conditions of the automatic transmission. In more detail, a particular speed shift may occur at various different vehicle road speeds and at various different engine load conditions, i.e., various different throttle openings. Generally speaking, the greater is the load upon the engine of the vehicle during shifting of transmission speed stage, the greater will be the torque which is required to be handled by the friction engaging mechanism which is being engaged. Accordingly, it has been practiced for the transmission line fluid pressure, which is the source of fluid pressure which is selectively switched by the aforementioned shift valve and which is output as an actuating fluid pressure for the servo device of the friction engaging mechanism, to be linearly increased according to increase of the load on the engine of the vehicle. In more detail, it has been practiced for the line fluid pressure to be at a predetermined base level when the load on the engine is zero or very low, and to be increased from this base level by an amount substantially proportional to the load on the engine. According to this, the actuating fluid pressure for the servo device of the friction engaging mechanism, which is this line pressure as controlled by the shift valve, is thereby also increased according to increase of the load upon the engine, and thereby is higher when the servo device of the friction engaging mechanism is required to control a higher torque.

This is because the magnitude of the torque which can be satisfactorily handled by such a friction engaging mechanism is substantially proportional to the magnitude of the actuating fluid pressure supplied thereto. Thus, roughly, to a first approximation, the use of such a line pressure, which increases linearly from a certain base pressure value according to engine load, as an actuating fluid pressure for a friction engaging mechanism, ensures that when the engine load is high, and accordingly the torque delivered by the engine is high, then the actuating fluid pressure for the friction engaging mechanism is also high.

However, more exactly, for the friction engaging mechanism to be smoothly engaged and disengaged by the selective supply of such an actuating fluid pressure, the actuating fluid pressure supplied to the servo device of the friction engaging mechanism should be more exactly suited to the magnitude of the torque required to be controlled by the friction engaging mechanism. That is to say, if the engine of the vehicle is producing a high torque, which is generally the case when the load on said engine is high, it is desirable that the actuating fluid pressure supplied to the friction engaging mechanism should be higher than when the engine is only producing a medium or low torque. In the prior art, the actuating fluid pressure of such a friction engaging mechanism typically has been line fluid pressure, which, as explained above, has increased linearly with the load upon the engine of the vehicle. However, the torque delivered by the engine of the vehicle does not increase strictly linearly with the load thereon. In fact, the graph of torque against load for a typical internal combustion engine is convex upwards, i.e., the rate of increase of torque with increase of load decreases according to increasing load. This difference in variation characteristic with respect to load on the engine, between the line pressure or the throttle pressure and the torque delivered by the engine, is quite significant, and has made it impossible in the prior art effectively to conform the fluid pressure supplied to the servo device of a friction engaging mechanism to the torque which is required to be controlled by the friction engaging mechanism. In other words, if the actuating fluid pressure provided to the servo device of such a friction engaging mechanism is arranged to be properly in conformity with the torque being delivered by the engine in the region of a particular engine load which is required to be controlled, then in other ranges of engine load this conformity between actuating fluid pressure and torque to be controlled will no longer be the case. In fact, in the prior art, it has been impractical to conform the actuating fluid pressure supplied to an actuator of such a friction engaging mechanism to the torque required to be controlled by the friction engaging mechanism, over a wide range of engine load.

SUMMARY OF THE INVENTION

Therefore, in view of the above outlined difficulty, it is an object of the present invention to provide an improved fluid pressure control system for an automatic transmission of the general type described above, in which the pressure supplied as an actuating fluid pressure for the fluid pressure actuator of the friction engaging mechanism is not the same as the line pressure, but is modified therefrom, and is so conformed, with regard to variation of engine load, to the torque produced by the engine of the vehicle, that, over a wide range of engine load, smooth engagement and disengagement of the friction engaging mechanism is effected, and thereby it is an object of the present invention to provide smooth operation of the automatic transmission without undue gear shift shock, over a wide range of load on the engine of the vehicle.

It is a further object of the present invention to provide such a fluid pressure control system in which the pressure for supply as an actuating fluid pressure for the servo unit of the friction engaging mechanism is simply produced by simply modifying line pressure by a relatively cheap and easy to manufacture hydraulic fluid pressure device.

It is a further object of the present invention to provide such a fluid pressure control system for an automatic transmission in which the device producing the aforesaid actuating fluid pressure for the servo unit of the friction engaging mechanism is reliable during operation and has a long service life.

According to the present invention, these and other objects are attained by, for an automatic transmission for an automotive vehicle, comprising a gear transmission mechanism and a plurality of fluid pressure actuated friction engaging mechanisms, a plurality of speed stages being provided by said gear transmission mechanism according to selective actuation of said friction engaging mechanisms; a fluid pressure control system, comprising: (a) a line fluid pressure control valve which produces a line fluid pressure which increases from a predetermined base pressure approximately proportionally to a quantity representative of engine load; (b) a throttle fluid pressure control valve which produces a throttle fluid pressure which is approximately proportional to said quantity representative of engine load; (c) a means for controlling fluid pressure, which receives supply of said line pressure, and which outputs an output fluid pressure which, when said quantity representative of engine load is in the small range, or is in the large range, is substantially lower than said line pressure, but which, when said quantity representative of engine load is in the medium range, is approximately equal to said line pressure; and (d) a shift valve which receives said output fluid pressure and which, according to the operational conditions of the vehicle, selectively supplies it as an actuating fluid pressure to one of said friction engaging mechanisms.

Further, according to a particular aspect of the present invention, these and other objects are more particularly attained by such a fluid pressure control system as described above, wherein, further, said fluid pressure control means comprises: a first fluid pressure modulation valve, which is supplied with the throttle pressure, and which outputs a throttle modulator fluid pressure which is the same as throttle pressure when the throttle pressure is below a first predetermined level, and is equal to said first predetermined level when the throttle pressure is greater than said first predetermined level; and a second fluid pressure modulation valve, which receives said line fluid pressure and said throttle modulator fluid pressure, and which produces, as said output of said fluid pressure control means, a fluid pressure which, when the line pressure is lower than a second predetermined pressure, is less than line pressure, but increases faster with increasing engine load than does said line pressure; when said line pressure is between said second predetermined pressure and a third predetermined pressure, is substantially equal to line pressure; and, when line pressure is greater than said third predetermined pressure, is substantially equal to said predetermined pressure; whereby the overall shape of the graph of said output fluid pressure of said fluid pressure control means as the ordinate, and engine load as the abscissa, is convex upwards; whereby said shift valve is provided with a pressure to supply to said friction engaging mechanism as an actuating fluid pressure, the variation of which with respect to engine load is of the same general nature, as is the variation of engine torque with respect to engine load; and further wherein: said first fluid pressure modulation valve comprises: a first bore; a first valve element slidably mounted within said first bore; a first input port opening in said first bore; a first output port, opening in said first bore, communication of which with said first input port is established when said first valve element is positioned beyond a first point in a first direction within said first bore, and communication of which to said first input port is interrupted when said first valve element is positioned beyond said first point in a direction opposite to said first direction within said first bore; a first compression coil spring biasing said first valve element in said first direction; and a first biasing chamber, supply of fluid pressure to which biases said first valve element in the direction opposite to said first direction; said throttle pressure being supplied to said first input port, and said throttle modulator fluid pressure being taken out from said first output port and also being fed therefrom to said first biasing chamber; and said second fluid pressure modulation valve comprises: a second bore; a second valve element slidably mounted within said second bore; a second input port opening in said second bore; a second output port, opening in said second bore, communication of which with said second input port is established when said second valve element is positioned beyond a second point in a section direction within said second bore, and communication of which to said second input port is interrupted when said second valve element is positioned beyond said second point in a direction opposite to said second direction within said second bore; a second compression coil spring biasing said second valve element in said second direction; a second biasing chamber, supply of fluid pressure to which biases said second valve element in the direction opposite to said second direction; and a third biasing chamber, supply of fluid pressure to which biases said second valve element in said second direction; said line pressure being supplied to said second input port, said throttle modulator fluid pressure being supplied to said third biasing chamber, and said output fluid pressure of said fluid pressure control means being taken out from said second output port and also being fed therefrom to said second biasing chamber.

According to such a construction, because the novel pressure modifying device incorporating the first pressure modulator valve and the second pressure modulator valve is fitted so as to modify the actuating fluid pressure supplied to the servo unit of the friction engaging mechanism, this actuating pressure is suitably conformed to the magnitude of the torque which is being delivered by the engine of the vehicle, over a wide range of engine load, as will be seen hereinafter. Accordingly, transmission shift shock is effectively reduced in a transmission which incorporates this fluid pressure control system.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the embodiment, and the drawings, are all of them provided purely for the purposes of illustration and exemplification only, and are in no way to be taken as limitative of the scope of the present invention. In the drawings:

FIG. 1 is a graph, in which engine load is the abscissa, and torque is the ordinate, illustrating changes of the torque transmission ability of a friction engaging device, and the changes in output torque, with respect to load, for an internal combustion engine;

FIG. 2 is a schematic view, in part block diagram form, showing a preferred embodiment of the fluid pressure control system for an automatic transmission according to the present invention; and FIG. 3 is a graph, in which the engine load is the abscissa and fluid pressure is the ordinate, showing the relation to engine load of a line pressure and of a throttle pressure, both according to the prior art and according to the fluid pressure control system of the present invention.

DESCRIPTION OF THE PREFERRED EMBODIMENT

The present invention will now be described in terms of a preferred embodiment thereof, and with reference to the accompanying drawings.

However, first some deficiencies of the prior art will be more clearly explained, with reference to FIG. 1.

In the prior art, as has been explained above, it is common to supply the line fluid pressure as an operating pressure to the fluid actuator of a friction engaging mechanism, and for the line fluid pressure to be determined so that it is equal to a fundamental or base value when the engine load is zero or small, and for the line fluid pressure to increase linearly from this base value according to increase in the engine load. As has been stated above, the torque transmitting ability of the friction engaging mechanism is substantially proportional to the actuating fluid pressure supplied thereto, and therefore in FIG. 1 the solid line A shows the typical performance of the torque transmitting ability of such a friction engaging mechanism, with relation to engine load. Thus, the line A is a straight line. On the other hand, the performance with respect to engine load of the torque delivered by the engine is, typically, represented by such a line as B, which as will be seen is a curved line which is convex upwards. Accordingly, although in the region of engine load around the 50% value, in this illustrated case, the torque transmission ability of the friction engaging mechanism is well suited to the torque delivered by the engine, however in the low load region around 0% engine load, and in the high load region around 100% engine load, there is a large difference between the torque transmitting ability of the friction engaging mechanism and the torque delivered by the engine. Accordingly, in this prior art case, substantial shift shock will be caused when the friction engaging mechanism is engaged in either the aforesaid low engine load region, or in the aforesaid high engine load region, due to this disparity in the performance of the friction engaging mechanism with regard to torque control, and the torque which it is required to control. In other words, although the characteristics of the system are well suited for the case when engine load is approximately 50%, at high load conditions the system will not work smoothly. Similarly, at low load conditions, equally, the system will not function properly.

In FIG. 2, there is shown a somewhat schematic view of a fluid pressure control circuit for an automatic transmission which is a preferred embodiment of the present invention. In this figure, only some of the parts of the fluid pressure control system are shown in concrete form, and some of the parts thereof which are of constructions which are per se well known are shown in block diagram form, for the purposes of simplicity of description.

In the figure, the reference numeral 1 denotes an automatic transmission for use in a vehicle, and the construction of this automatic transmission is per se well known. This automatic transmission 1 comprises a gear transmission mechanism 2, of which the construction is also per se well known. This gear transmission mechanism 2 comprises a plurality of fluid pressure actuated friction engaging mechanisms, two of which are designated by reference numerals 3 and 4, and are also shown in block diagram form.

A plurality of speed stages are available from the gear transmission mechanism 2 for the automatic transmission 1, according to selective actuation of the various friction engaging mechanisms incorporated therein. In the following, however, only the engagement of the friction engaging mechanisms 3 and 4 will be discussed, although the present invention will of course be equally applicable to all such friction engaging mechanisms comprised within the gear transmission mechanism 2.

According to the present invention, it will be later seen that the actuating fluid pressure for operating the friction engaging mechanisms 3 and 4 is suitably conformed to the torque being produced by the engine of the vehicle, over a wide range of engine load. The present invention is particularly suited to the case where the friction engaging mechanisms 3 and 4 are those which are engaged and disengaged for providing overdrive gearing from the gear transmission mechanism 2, because in this case the friction engaging mechanisms bear relatively low torque load, and therefore, if the torque bearing characteristic of the friction engaging mechanisms is well adapted to the torque generating characteristic of the engine, smooth gear shifting will be available without providing any such device as an accumulator in any intermediate portion of the fluid pressure conduits which lead actuating pressure to the fluid engaging mechanisms. In this embodiment, the friction engaging mechanism 3 is a brake, engagement of which sets an overdrive gear mechanism to its overdrive stage; and the friction engaging mechanism 4 is a clutch, engagement of which sets the overdrive gear mechanism into its directly coupled condition.

The reference numeral 5 denotes a fluid pressure control circuit of which the construction is per se well known, and which comprises a hydraulic fluid pressure pump 6 for producing a supply of hydraulic fluid pressure, a line fluid pressure control valve 7, a throttle fluid pressure control valve 8, and a governor fluid pressure control valve 9, the constructions of all of which are per se well known.

The line fluid pressure control valve 7 produces a line fluid pressure which, in the fashion explained above, is equal to a fundamental or base line pressure when the load on the internal combustion engine of the vehicle is zero or very low, and which increases linearly from this base value as the load upon the engine increases. That is to say, the line fluid pressure control valve 7 produces a line fluid pressure which increases according to increased load upon the engine as shown in FIG. 3 by the solid line L.

The throttle fluid pressure control valve 8 produces a throttle fluid pressure which is substantially proportional to the load upon the engine, and the performance of which, with respect to engine load, is shown, as an example, by the solid line T in FIG. 3. It should here be noted that, although in FIG. 3 the slopes of the lines L and T are shown as being the same, in other words, the proportionality constant with respect to engine load of the performance of the line pressure and of the performance of the throttle pressure are shown exemplarily as being the same, this is not essential for the present invention.

The governor fluid pressure control valve 9 produces a governor fluid pressure which is substantially proportional to the road speed of the vehicle, in a per se well known fashion.

The reference numeral 10 denotes a shift valve, which in this embodiment, as stated above, is a shift valve for controlling the friction engaging mechanisms 3 and 4, and which functions for controlling the shifting of the automatic transmission 1 between its third speed or direct coupled stage and an overdrive speed stage. The operation of the shift valve 10 is per se well known, in that it controls selective supply of an actuating fluid pressure to the friction engaging mechanisms 3 and 4. However, this fluid pressure, selective supply of which is controlled, is not line fluid pressure, but is a modified fluid pressure produced by a fluid pressure modification circuit which will be described in detail hereinafter.

In more detail, the shift valve 10 comprises a lower valve element 11 and an upper valve element 12 and a piston 13 mounted above the upper valve element 12 in the figure, all of which are coaxially and slidably fitted within a bore formed in the housing of the shift valve 10. On the left hand side of the axis of the bore of the shift valve 10, in FIG. 2, the valve elements 11 and 12 and the piston 13 are shown in their downwardly biased positions, and on the right hand side of said axis they are shown in their upwardly biased positions. The aforesaid modified fluid pressure for actuating the friction engaging units 3 and 4 is supplied to dual input ports 14 and 15 of the shift valve 10 from a fluid conduit 46, and, when the valve elements 11 and 12 are in their downwardly biased positions as shown on the left hand side of the axis of the shift valve 10 in FIG. 2, the actuating fluid pressure supplied to the input port 14 is not communicated to an output port 16, while the fluid pressure supplied to the input port 15 is communicated to an output port 18, whence via a conduit 19 it is supplied to the friction engaging mechanism 4, and thereby sets the overdrive mechanism of the gear transmission mechanism 2 to its directly coupled speed stage. On the other hand, when the valve elements 11 and 12 and the piston 13 are shifted to their upwardly biased positions as shown on the right hand side of the axis of the shift valve 10 in FIG. 2, then the actuating fluid pressure supplied to the input port 14 is conducted to the output port 16, whence via a fluid conduit 17 it is conducted to the friction engaging mechanism 3, while on the other hand the actuating fluid pressure supplied to the input port 15 is not communicated to the output port 18, and thereby the overdrive mechanism of the gear transmission mechanism 2 is set to the overdrive speed stage.

The governor pressure Pgo is fed to a governor pressure input port 20 situated in the lower part of the shift valve 10 in FIG. 2, and the throttle pressure Pth is fed to a throttle pressure input port 21 situated in the upper part of the shift valve 10 in FIG. 2. A compression coil spring 22 biases the piston 13 and the valve elements 11 and 12 in the downwards direction in the drawing. An override pressure port 23 opens to a chamber defined above the piston 13 in the drawing.

Thus, when no fluid pressure is supplied to the override port 23, via a fluid conduit 24, the valve elements 11 and 12 are moved upwards and downwards in the drawing, according to an equilibrium between the governor pressure supplied to the governor pressure port 20, which drives them upwards in the drawing, and the throttle pressure supplied to the throttle pressure port 21 which drives them downwards in the drawing. Thus, when the throttle pressure Pth is relatively large with respect to the governor pressure Pgo, then the valve elements 11 and 12 are biased downwards in the drawing so as to supply fluid pressure to the friction engaging mechanism 4 and not to the friction engaging mechanism 3, so as to set the overdrive mechanism to its directly connected speed stage, whereas, on the other hand, when the governor pressure Pgo is relatively large with respect to the throttle pressure Pth, then the valve elements 11 and 12 are shifted upwards in the drawing, so as to provide actuating fluid pressure to the friction engaging mechanism 3 and not to the friction engaging mechanism 4, so as to set the overdrive unit to its overdrive speed stage.

On the other hand, when override pressure is supplied, via the fluid conduit 24, from the fluid pressure control circuit 5 to the override port 23 of the shift valve 10, then this pressure compulsorily drives the piston 13 and the valve elements 11 and 12 downwards in the drawing, so as to supply fluid pressure to the friction engaging mechanism 4 and not to the friction engaging mechanism 3, so as compulsorily to set the overdrive unit of the gear transmission mechanism 2 to its directly connected condition, overcoming the aforesaid equilibrium relationship between the throttle pressure Pth and the governor pressure Pgo.

Also, in fact, the fluid pressure supplied to the friction engaging mechanism 4 is supplied, via a fluid conduit, to a port 25 which communicates to a narrow annular chamber formed around the piston 13. This is in order to provide a certain hysteresis effect in the operation of the shift control valve 10.

Thus, as explained above, in a per se well known way, the shift valve 10 selectively switches supply of an actuating fluid pressure to the friction engaging mechanisms 3 and 4. The actuating fluid pressure which is selectively switched is provided by a fluid pressure modification circuit which will now be described.

The reference numerals 26 and 27 denote, respectively, a first pressure modulator valve and a second pressure modulator valve.

The first pressure modulator valve 26 comprises a valve element 28, which reciprocates upwards and downwards in the drawing within a bore formed in a housing, and which is biased in the upwards direction in the figure by a compression coil spring 35. Likewise, the second pressure modulator valve 27 comprises a valve element 36, which reciprocates upwards and downwards in the drawing within a bore formed in a housing, and which is biased in the upwards direction in the figure by a compression coil spring 45.

The throttle fluid pressure Pth is fed from the fluid pressure control circuit 5, via a fluid conduit 32, to an input port 30 of the first pressure modulator valve 26. As the valve element 28 moves upwards and downwards within its bore, a land portion 29 thereof controls the amount of communication between the input port 30 and an output port 31 of the first pressure modulator valve 26. The fluid pressure appearing at the output port 31 is fed back, via a throttling element and a fluid conduit 33, to a biasing port 34 at the upper end in the drawing of the first pressure modulator valve 26, whence it enters a chamber where it bears on the upper end of the valve element 28. Thus, the valve element 28 is driven to and fro within its bore under the opposing actions of this force on its upper end in the drawing due to this fed back fluid pressure, and the force due to the compression coil spring 35. Further, when the valve element 28 moves a certain distance downwards in the drawing, the land portion 29 cuts off communication between the input port 30 and the output port 31, and accordingly the pressure at the output port 31 immediately drops.

Accordingly, with this construction, when the throttle fluid pressure Pth is less than a predetermined value, there appears at the output port 31 a fluid pressure having the same value as this throttle fluid pressure, but, when the throttle fluid pressure Pth is above this predetermined value, then the pressure at the output port 31 remains at this predetermined value, by the action of the valve element 28. This fluid pressure at the output port 31 will be called "throttle modulator fluid pressure", and it is related to engine load as shown in FIG. 3, by modifying part of the solid line T. In other words, the throttle modulator fluid pressure rises from substantially zero pressure at zero engine load to a predetermined value equal to throttle pressure at a predetermined value of engine load, and, as engine load increases thencefrom, remains constant at this predetermined value.

Via a fluid passage 44, this throttle modulator fluid pressure appearing at the output port 31 of the first pressure modulator valve 26 is fed to an input port 43 of the second fluid pressure modulator valve 27.

The second fluid pressure modulator valve 27 is constructed similarly to the first fluid pressure modulator valve 26, except that an additional pressure biasing chamber is provided at its lower part in the drawing, in which the compression coil spring 45 is located. In more detail, the line pressure P1 is fed through a fluid conduit 40 to an input port 38 of the second fluid pressure modulator valve 27 from the fluid pressure control circuit 5, and is communicated from this port 38 to an output port 39. The pressure appearing at the output port 39 is, in a fashion similarly to the operation of the first fluid pressure modulator valve 26, fed back through a fluid pressure 41 to a biasing port 42 of the second fluid pressure modulator valve 27, through which it enters to a chamber above the valve element 36 in the drawing, so as to bias the valve element 36 downwards in the drawing. The valve element 36 is biased upwards in the drawing, not only by the compression force of the compression coil spring 45, but also by the throttle modulator fluid pressure which is supplied to the aforementioned port 43. A land portion 37 formed on the valve element 36 controls the communication between the input port 38 and the output port 39.

Thereby, with this construction, there appears at the port 39 a fluid pressure which is obtained by proportionally modifying the line fluid pressure P1 supplied to the input port 38 by the throttle modulator fluid pressure which is supplied to the port 43. In this embodiment it is so arranged, by correctly designing the first and second fluid pressure modulator valves 26 and 27, that the line fluid pressure, which has the characteristics shown by the solid line L in FIG. 3 with relation to engine load, is modified so as to have a characteristic such as shown by the broken lines M and N in FIG. 3. However, because of course the line fluid pressure L cannot in fact be increased by such a modification, in fact the intermediate portion of the line showing the fluid pressure appearing at the output port 39 of the second fluid pressure modulator valve 27 is as shown in FIG. 3 by the intermediate portion of the solid line L. In other words, the performance of the fluid pressure appearing at the port 39, with relation to engine load, is as shown by the line M-L-N in FIG. 3, i.e. is convex upwards, and is more similar to the characteristic of engine torque against engine load, than is a straight line.

Accordingly, when this fluid pressure appearing at the output port 39 of the second fluid pressure modulation valve 27 is supplied, via the fluid conduit 46, to the ports 14 and 15 of the shift valve 10, for selective supply to the friction engaging mechanisms 3 and 4 as an actuating fluid pressure, then, as shown in FIG. 1, the torque transmission ability characteristic of either of these friction engaging mechanisms, with relation to engine load, is modified as shown by the broken lines, in the high and in the low engine load regions. In other words, the torque transmission characteristic of the friction engaging mechanism is modified so as to be somewhat convex upward. Thereby, the torque transmission ability characteristics of the friction engaging mechanisms are much more suitably conformed to the torque output characteristic of the internal combustion engine, shown by line B in FIG. 1.

Thus, according to the present invention, it is so arranged that the torque transmitting ability of the friction unit is, over the entire range of engine load, suitably conformed to the amount of torque which is actually being output by the engine. Thereby, it is possible to achieve smooth changing of gear shift stage of an automatic transmission, over a wide range of engine load, without any undue gear shift shock or the like being produced. As has been mentioned before, this is of particular applicability to the case of shifting between a direct drive gear stage and an overdrive gear stage.

Although the present invention has been shown and described in terms of several preferred embodiment thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawings.

We claim:

1. For an automatic transmission for an automotive vehicle, comprising a gear transmission mechanism and a plurality of fluid pressure actuated friction engaging mechanisms, a plurality of speed stages being provided by said gear transmission mechanism according to selective actuation of said friction engaging mechanisms; a fluid pressure control system, comprising:
    (a) a line fluid pressure control valve which produces a line fluid pressure which increases from a predetermined base pressure approximately proportionally to a quantity representative of engine load;
    (b) a throttle fluid pressure control valve which produces a throttle fluid pressure which is approximately proportional to said quantity representative of engine load;
    (c) a means for controlling fluid pressure, which receives supply of said line pressure and said throttle pressure and outputs an output fluid pressure, and which comprises;
    a first fluid pressure modulation valve, which is supplied with the throttle pressure, and which outputs a throttle modulator fluid pressure which is the same as throttle pressure when the throttle pressure is below a first predetermined level, and is equal to said first predetermined level when the throttle pressure is greater than said first predetermined level; and
    a second fluid pressure modulation valve, which receives said line fluid pressure and said throttle modulator fluid pressure, and which produces, as said output of said fluid pressure control means, a fluid pressure which, when the line pressure is lower than a second predetermined pressure, is less than line pressure, but increases faster with increasing engine load than does said line pressure; when said line pressure is between said second predetermined pressure and a third predetermined pressure, is substantially equal to line pressure; and, when line pressure is greater than said third predetermined pressure, is substantially equal to said predetermined pressure;
    (d) a shift valve which receives said output fluid pressure and which, according to the operational conditions of the vehicle, selectively supplies it as an actuating fluid pressure to one of said friction engaging mechanisms;
    whereby the overall shape of a graph of said output fluid pressure of said fluid pressure control means as the ordinate, and engine load as the abscissa, is convex upwards;
    whereby said shift valve is provided with a pressure to supply to said friction engaging mechanism as an actuating fluid pressure, the variation of which with respect to engine load is of the same general nature, as is the variation of engine torque with respect to engine load.

2. For an automatic transmission for an automotive vehicle, comprising a gear transmission mechanism and a plurality of fluid pressure actuated friction engaging mechanisms, a plurality of speed stages being provided by said gear transmission mechanism according to selective actuation of said friction engaging mechanisms; a fluid pressure control system, comprising:
    (a) a line fluid pressure control valve which produces a line fluid pressure which increases from a predetermined base pressure approximately proportionally to a quantity representative of engine load;
    (b) a throttle fluid pressure control valve which produces a throttle fluid pressure which is approximately proportional to said quantity representative of engine load;
    (c) a means for controlling fluid pressure, which receives supply of said line fluid pressure and said throttle fluid pressure and outputs an output fluid pressure, and which comprises:
    a first fluid pressure modulation valve comprising: a first bore; a first valve element slidably mounted with said first bore; a first input port opening in said first bore; a first output port, opening in said first bore, communication of which with said first input port is established when said first valve element is positioned beyond a first point in a first direction within said first bore, and communication of which to said first input port is interrupted when said first valve element is positioned beyond said first point in a direction opposite to said first direction within said first bore; a first compression coil spring biasing said first valve element in said first direction; and first biasing chamber, supply of fluid pressure to which biases said first valve element in the direction opposite to said first direction; said throttle pressure being supplied to said first input port, and a throttle modulator fluid pressure being taken out from said first output port and also being fed therefrom to said first biasing chamber;
    and a second fluid pressure modulation valve comprising: a second bore; a second valve element slidably mounted within said second bore; a second input port opening in said second bore; a second output port, opening in said second bore, communication of which with said second input port is established when said second valve element is positioned beyond a second point in a second direction within said second bore, and communication of which to said second input port is interrupted when said second valve element is positioned beyond said second point in a direction opposite to said second direction within said second bore; a second compression coil spring biasing said second valve element in said second direction; a second biasing chamber, supply of fluid pressure to which biases said second valve element in the direction opposite to said second direction; and a third biasing chamber, supply of fluid pressure to which biases said second valve element in said second direction; said line pressure being supplied to said second input port, said throttle modulator fluid pressure being supplied to said third biasing chamber, and an output fluid pressure of said fluid pressure control means being taken out from said second output port and also being fed therefrom from to said second biasing chamber;

(d) a shift valve which receives said output fluid pressure and which, according to the operational conditions of the vehicle, selectively supplies it as an actuating fluid pressure to one of said friction engaging mechanisms wherein structural parameters of said first and second fluid pressure modulation valves are so determined that, in a first range of throttle opening between zero opening and a relatively small intermediate opening said output fluid pressure is lower than said line pressure and increases more rapidly than said line pressure as throttle opening increases so as to become the same as said line pressure when throttle opening reaches the upper limit of said first range of throttle opening, in a second range of throttle opening between a relatively large intermediate opening and full opening said output fluid pressure is lower than said line pressure and is substantially constant regardless of throttle opening so as to be the same level as the line pressure at the lower limit of throttle opening in said second range, and in a third range of throttle opening between said first range and said second range said output fluid pressure is the same as said line pressure.

* * * * *